(12) United States Patent
Okuda

(10) Patent No.: US 12,057,833 B2
(45) Date of Patent: Aug. 6, 2024

(54) CONTROL DEVICE AND INPUT-OUTPUT INTERFACE UNIT

(71) Applicant: YAZAKI CORPORATION, Tokyo (JP)

(72) Inventor: Sadaharu Okuda, Makinohara (JP)

(73) Assignee: YAZAKI CORPORATION, Tokyo (JP)

(*) Notice: Subject to any disclaimer, the term of this patent is extended or adjusted under 35 U.S.C. 154(b) by 323 days.

(21) Appl. No.: 17/837,035

(22) Filed: Jun. 10, 2022

(65) Prior Publication Data
US 2022/0399894 A1 Dec. 15, 2022

(30) Foreign Application Priority Data

Jun. 11, 2021 (JP) ................................. 2021-098246

(51) Int. Cl.
*H03K 19/17* (2006.01)
*H03K 19/17736* (2020.01)
*H03K 19/17772* (2020.01)
*H03K 19/17784* (2020.01)

(52) U.S. Cl.
CPC ... *H03K 19/17744* (2013.01); *H03K 19/1774* (2013.01); *H03K 19/17772* (2013.01); *H03K 19/17784* (2013.01)

(58) Field of Classification Search
CPC ......... H03K 19/17744; H03K 19/1774; H03K 19/17772; H03K 19/17784; G06F 21/606; G06F 21/85; G05B 23/0221; B60R 16/02; B60R 16/0207
See application file for complete search history.

(56) References Cited

U.S. PATENT DOCUMENTS

| | | | |
|---|---|---|---|
| 9,081,911 B2 | 7/2015 | Powers et al. | |
| 2014/0285985 A1 | 9/2014 | Tanaka et al. | |
| 2018/0304829 A1* | 10/2018 | Yanagawa | H01L 29/00 |
| 2021/0110022 A1 | 4/2021 | Russell et al. | |

FOREIGN PATENT DOCUMENTS

| | | |
|---|---|---|
| JP | 2007-307813 A | 11/2007 |
| JP | 2008-197706 A | 8/2008 |
| JP | 2014-187123 A | 10/2014 |

* cited by examiner

*Primary Examiner* — Michael V Kerrigan
(74) *Attorney, Agent, or Firm* — KENEALY VAIDYA LLP

(57) ABSTRACT

A timer circuit switches a second changeover switch and a third changeover switch to a pulse output unit for a certain period of time when power supply is started, and causes the pulse output unit to output a code pulse to a second communication line. An input-output control unit switches a first changeover switch to a first terminal for the certain period of time when the power supply is started, determines whether a code indicated by the code pulse received from the first terminal is a regular code, and cuts off electric power supplied from a first power supply line to a second power supply line when the code is not the regular code.

3 Claims, 3 Drawing Sheets

CONTROL DEVICE AND INPUT-OUTPUT INTERFACE UNIT

CROSS-REFERENCE TO RELATED APPLICATIONS

This application is based on and claims priority under 35 USC 119 from Japanese Patent Application No. 2021-098246 filed on Jun. 11, 2021, the contents of which are incorporated herein by reference.

TECHNICAL FIELD

The present invention relates to a control device and an input-output interface unit.

BACKGROUND ART

In a substrate unit used for controlling an electrical device mounted on a vehicle, an input unit or an output unit, a control circuit, a connector for connection to the electrical device, and the like are generally mounted on a substrate (for example, Patent Literature 1), The vehicle has various specifications, and the number of electrical devices to be mounted varies depending on the specifications. Therefore, it is necessary to design the substrate configuring the substrate unit for each specification.

Therefore, in order to prevent the waste, it is considered to design a portion of a difference in specification on a separate substrate. Specifically, a control circuit (control unit) and an input unit or an output unit are provided on separate substrates, and the substrate on which the control circuit is mounted (hereinafter, referred to as a control device) is connected to the substrate on which the input unit or the output unit matching the specification is mounted (hereinafter, referred to as an input-output interface unit).

However, in this case, there is a problem in that an unauthorized device is connected to the input-output interface unit via a connection unit provided in the control device, resulting in a possibility of unauthorized accessing to the control device.

CITATION LIST

Patent Literature

Patent Literature 1: JP-2014-187123-A

SUMMARY OF INVENTION

The present invention has been made in view of the above circumstances, and an object of the present invention is to provide a control device and an input-output interface unit capable of preventing unauthorized accessing to the control device when an unauthorized device is connected to the control device.

In order to achieve the above object, a control device and an input-output interface unit according to the present invention are characterized as follow.

A control device according to the present disclosure controls an input-output interface unit including an input-output circuit which is one of an input circuit and an output circuit for an electrical device.

The control device includes a first power supply line to which electric power is supplied, a first communication line through which a signal is transmitted, a first connection unit configured to connect a second power supply line and a second communication line of the input-output interface unit to the first power supply line and the first communication line a control unit configured to control the input-output interface unit, and a first changeover unit configured to switch a connection destination of the first communication line between a first terminal that receives a code pulse and a second terminal that receives or outputs a communication signal.

The control unit switches the first changeover unit to the first terminal for a certain period of time when the power supply is started, determines whether a code indicated by the code pulse received from the first terminal is a regular code, and cuts off the electric power supplied from the first power supply line to the second power supply line when the code is not the regular code.

In addition, an input-output interface unit according to the present disclosure includes an input-output circuit which is one of an input circuit and an output circuit for an electrical device, and operates in accordance with communication with a control device.

The input-output interface unit includes a second power supply line to which electric power is supplied, a second communication line through which a signal is transmitted, a second connection unit configured to connect a first power supply line and a first communication line of the control device to the second power supply line and the second communication line, a pulse output unit configured to output a code pulse, a second changeover unit configured to switch a connection destination of the second power supply line between the pulse output unit and the input-output circuit, a third changeover unit configured to switch a connection destination of the second communication line between the pulse output unit and the input-output circuit, and a timer circuit configured to switch the second changeover unit and the third changeover unit to the pulse output unit for a certain period of time when the power supply is started, and cause the pulse output unit to output the code pulse to the second communication line.

The present invention has been briefly described above. Further, details of the present invention will be clarified by reading an aspect (hereinafter, referred to as an "embodiment") for implementing the invention to be described below with reference to the accompanying drawings.

DESCRIPTION OF EMBODIMENTS

A specific embodiment according to the present invention will be described below with reference to the accompanying drawings.

Figure 1:
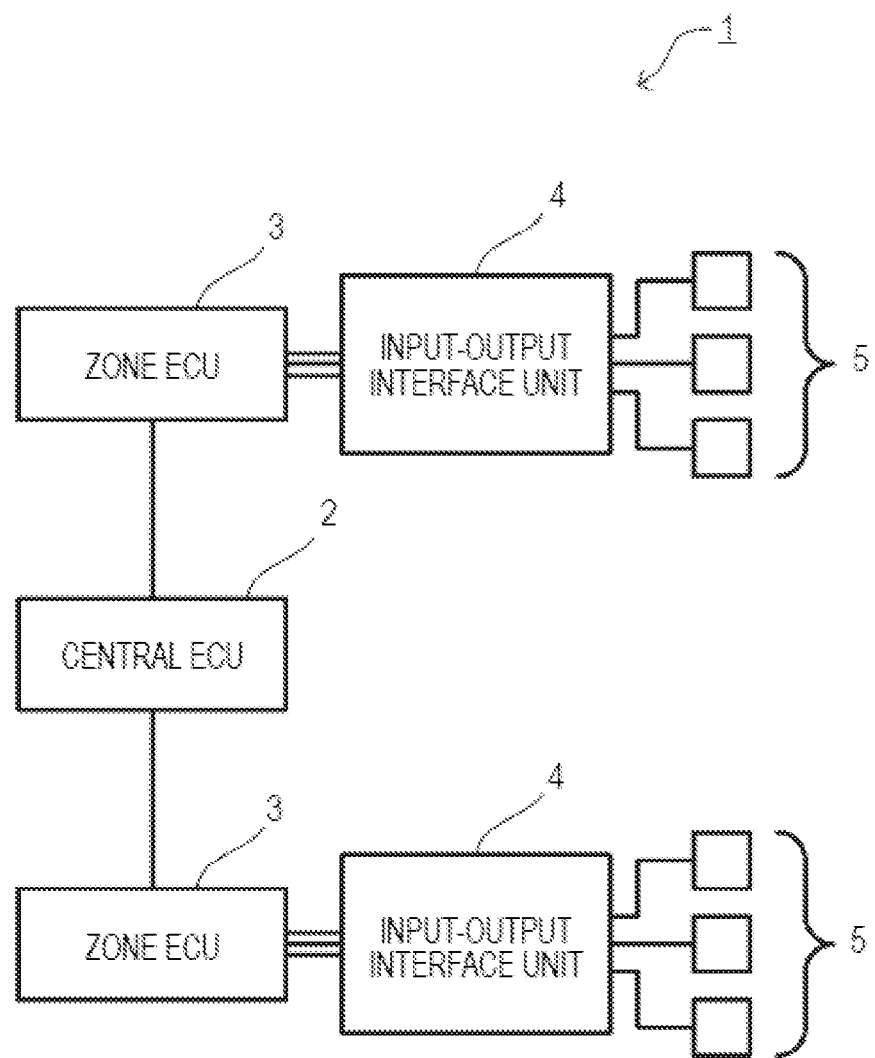
FIG. 1 is a block diagram showing an embodiment of a communication system according to the present invention.

FIG. 1 is a block diagram showing an embodiment of a communication system 1 according to the present invention.

FIG. 1 is a block diagram showing the communication system 1 in which zone ECUs 3 as a control device of the present invention and input-output interface units 4 are incorporated. The communication system 1 according to the present embodiment is mounted on a vehicle. The communication system 1 includes a central ECU 2, the zone ECUs 3, and the input-output interface units 4.

The central ECU 2 is formed by a microcomputer including a memory such as a RAM and a ROM and a CPU that operates in accordance with a program stored in the memory, and is provided in, for example, an instrument panel of the vehicle. The central ECU 2 controls the entire communication system 1.

The zone ECU 3 is provided in each area of the vehicle such as left and right doors. The zone ECU 3 communicates with the central ECU 2 and controls the input-output interface unit 4 connected to an electrical device 5 according to an instruction from the central ECU 2.

Figure 2:
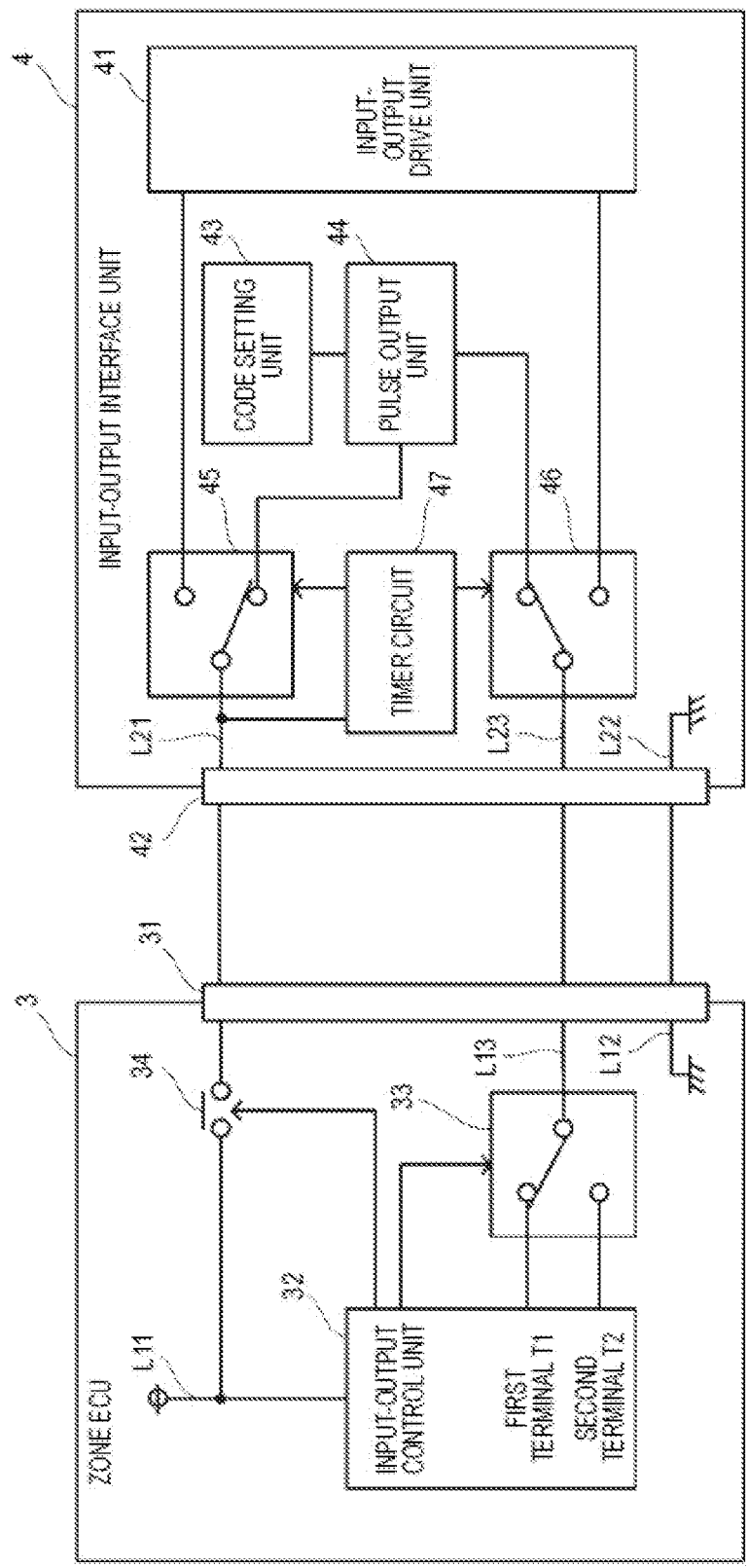
FIG. 2 is a configuration diagram of a zone ECU and an input-output interface unit shown in FIG. 1.

Next, detailed configurations of the zone ECU 3 and the input-output interface unit 4 described above will be described with reference to FIG. 2.

First, the zone ECU 3 will be described. The zone ECU 3 includes first power supply lines L11, L12, a first communication line L13, a first connector 31 (first connection unit), an input-output control unit 32 (control unit), a first changeover switch 33 (first changeover unit), a power supply switch 34, and a substrate (not shown) on which these components are mounted. Electric power is supplied from the central ECU 2 to the first power supply lines L11, L12. The first power supply line L11 is supplied with a positive electrode side potential of the electric power, and the first power supply line L12 is supplied with a negative electrode (ground) side potential of the electric power. The first communication line L13 is a communication line for performing, for example, SPI communication with an input-output drive unit 41 of the input-output interface unit 4 to be described later. In the present embodiment, the first power supply lines L11, L12 and the first communication line L13 are formed of a wiring pattern formed on the substrate.

The first connector 31 is a connector for connecting the first power supply lines L11, L12 and the first communication line L13 to the input-output interface unit 4 to be described later. In the present embodiment, the first connector 31 includes terminal fittings (not shown) respectively connected to the first power supply lines L11, L12 and the first communication line L13, and a connector housing (not shown) that accommodates the terminal fittings. The first connector 31 is connected to a second connector 42 provided in the input-output interface unit 4 to be described later.

The input-output control unit 32 is formed by a microcomputer including a memory such as a RAM and a ROM and a CPU that operates in accordance with a program stored in the memory. The input-output control unit 32 controls the input-output drive unit 41 of the input-output interface unit 4 to be described later, in accordance with communication with the central ECU 2.

The first changeover switch 33 is a switch for switching a connection destination of the first communication line L13 between a first terminal T1 for receiving a code pulse of the input-output control unit 32 and a second terminal T2 for receiving or outputting a communication signal. The switching of the first changeover switch 33 is controlled by the input-output control unit 32.

In the present embodiment, the first power supply line L11 branches into two lines, and one of the two branching lines is connected to the input-output control unit 32 to supply electric power to the input-output control unit 32. In addition, the first connector 31 is connected to the other one of the two branching lines, and supplies electric power to the input-output interface unit 4 to be described later.

The power supply switch 34 is provided on the branching line of the first power supply line L11 connected to the first connector 31. When the power supply switch 34 is turned off, the electric power supplied to the input-output interface unit 4 connected to the first connector 31 is cut off.

Next, the input-output interface unit 4 will be described. The input-output interface unit 4 includes the input-output drive unit 41 (input-output circuit), second power supply lines L21, L22, a second communication line L23, the second connector 42 (second connection unit), a code setting unit 43, a pulse output unit 44, a second changeover switch 45 (second changeover unit), a third changeover switch 46 (third changeover unit), a timer circuit 47, and a substrate (not shown) on which these components are mounted.

The input-output drive unit 41 includes at least one of an output circuit and an input circuit for the electrical device 5. The output circuit is provided for the electrical device 5 that operates by an output from the zone ECU 3, such as a motor or a lamp. The output circuit has a switch that is turned on under the control of the zone ECU 3 to supply electric power to the electrical device 5, and drives the electrical device 5.

The input circuit is provided for the electrical device 5, such as a detection switch, that inputs state information such as ON-OFF information to the zone ECU 3, and generates and inputs the state information to the zone ECU 3.

Electric power is supplied from the zone ECU 3 to the second power supply lines L21, L22. The second power supply line L21 is supplied with a positive electrode side potential of the electric power, and the second power supply line L22 is supplied with a negative electrode (ground) side potential of the electric power. The second communication line L23 is a communication line for performing, for example, the SPI communication with the input-output control unit 32 of the zone ECU 3 described above. The second power supply lines L21, L22 and the second communication line L23 are formed of a wiring pattern formed on the substrate.

The second connector 42 is a connector for connecting the second power supply lines L21, L22 and the second communication line L23 to the zone ECU 3 described above. In the present embodiment, the second connector 42 includes terminal fittings (not shown) respectively connected to the second power supply lines L21, L22 and the second communication line L23, and a connector housing (not shown) that accommodates the terminal fittings. The second connector 42 is connected to the first connector 31 provided in the zone ECU 3 described above. When the first connector 31 and the second connector 42 are connected, the first power supply line L11 and the second power supply line L21 are connected, the first power supply line L12 and the second power supply line L22 are connected, and the first communication line L13 and the second communication line L23 are connected.

The code setting unit 43 stores a code unique to the input-output interface unit 4, such as a product number. The pulse output unit 44 outputs a code pulse indicating the code stored in the code setting unit 43. The second changeover switch 45 is a switch for switching a connection destination of the second power supply line L21 between the pulse output unit 44 and the input-output drive unit 41. The third changeover switch 46 is a switch for switching a connection destination of the second communication line L23 between the pulse output unit 44 and the input-output drive unit 41.

The timer circuit 47 operates by receiving the electric power supplied from the second power supply line L21. The timer circuit 47 switches the second changeover switch 45 and the third changeover switch 46 to the pulse output unit 44 for a certain period of time when the power supply is started, and causes the pulse output unit 44 to output the code pulse to the second communication line L23.

Next, the SPI communication, which is an example of communication performed by the input-output control unit 32 and the input-output drive unit 41 described above, will be briefly described. The input-output control unit 32 and the input-output drive unit 41 are connected by a clock line, a chip selector line, an output line, and an input line. The input-output control unit 32 outputs a clock signal and a CS signal to the input-output drive unit 41 via the clock line and the chip selector (CS) line.

The input-output control unit 32 outputs a serial communication signal to the input-output drive unit 41 via the output line. When the CS signal is L (in a case of active low), the input-output drive unit 41 operates in accordance with the clock signal and the communication signal. Specifically, serial-to-parallel conversion is performed on the serial communication signal and the serial communication signal is output to each of a plurality of switches that supply electric power to a plurality of electrical devices 5, so that an output circuit constituting the input-output control unit 32 can supply electric power to the electrical device 5 according to the corresponding communication signal. When an input circuit constituting the input-output control unit 32 receives the communication signal, parallel-to-serial conversion is performed on the state information of each electrical device 5 and outputs the state information to the input line.

That is, the input-output drive unit 41 does not need to be constituted by a microcomputer or the like that operates in accordance with a program, and is constituted by an inexpensive serial-to-parallel conversion circuit, a parallel-to-serial conversion circuit, or the like. The first communication line L13 and the second communication line L23 include the clock line, the chip selector line, the output line, and the input line described above, and the line whose connection destination is switched by the first changeover switch 33 and the third changeover switch 46 is any one of the clock line, the chip selector line, the output line, and the input line.

Figure 3:
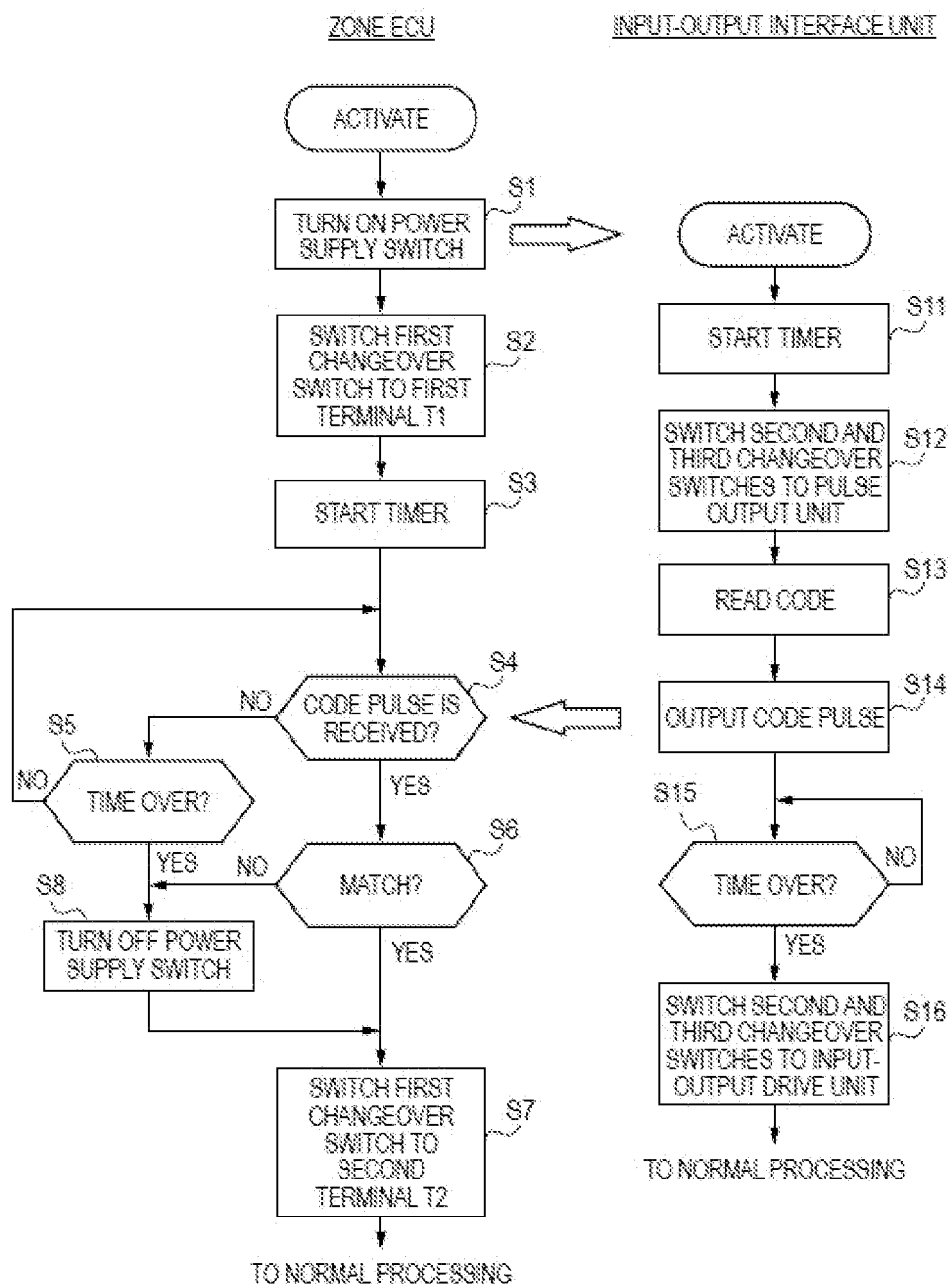
FIG. 3 is an operation sequence diagram for illustrating operations of the communication system shown in FIG. 1.

Next, operations of the communication system 1 having the above-described configuration will be described with reference to FIG. 3. First, when an ignition switch of the vehicle is turned on and electric power is supplied from the central ECU 2 to the first power supply lines L11, L12, the electric power is supplied to the input-output control unit 32, and the input-output control unit 32 is activated.

When the input-output control unit 32 is activated, the input-output control unit 32 turns on the power supply switch 34 (S1). When the power supply switch 34 is turned on, the electric power is supplied to the second power supply line L21 connected to the first power supply line L11 by the first and second connectors 31, 42. When the electric power is supplied to the second power supply line L21, the electric power is supplied to the timer circuit 47 of the input-output interface unit 4, and the timer circuit 47 is activated. Next, the input-output control unit 32 switches the first changeover switch 33 to the first terminal T1 (S2), and starts measuring a certain period of time (S3). Thereafter, the input-output control unit 32 waits for the input of the code pulse to the first terminal T (S4).

Meanwhile, when the timer circuit 47 is activated, the timer circuit 47 starts measuring the certain period of time (S11). Next, the timer circuit 47 switches the second and third changeover switches 45, 46 to the pulse output unit 44 (S12). As a result, the electric power is supplied to the pulse output unit 44, and the pulse output unit 44 is activated. When the pulse output unit 44 is activated, the pulse output unit 44 reads a code from the code setting unit 43 (S13), and outputs a code pulse indicating the read code to the second communication line L23 (S14).

The code pulse output to the second communication line L23 is input to the first terminal T1 of the input-output control unit 32 via the first communication line L13. When the code pulse is received from the first terminal T1 (Y in S4), the input-output control unit 32 determines whether the code indicated by the code pulse matches a regular code stored in the memory in advance (S6). When the code matches the regular code (Y in S6), the input-output control unit 32 switches the first changeover switch 33 to the second terminal T2 (S7), and then executes normal processing for controlling the input-output drive unit 41 of the input-output interface unit 4.

Meanwhile, when the timer circuit 47 of the input-output interface unit 4 finishes measuring the certain period of time (Y in S15), the timer circuit 47 switches the second and third changeover switches 45, 46 to the input-output drive unit 41 (S16), and then executes normal processing in which the input-output drive unit 41 performs operations under the control of the input-output control unit 32 of the zone ECU 3.

In contrast, when the code indicated by the code pulse does not match the regular code (in S6), or when the code pulse is not input to the first terminal T1 even after the certain period of time or longer has elapsed (Y in S5), the input-output control unit 32 determines that the regular input-output interface unit 4 is not connected, turns off the power supply switch 34 (S8), and then proceeds to S7. When the power supply switch 34 is turned off, no electric power is supplied to an unauthorized device connected to the first connector 31, and accessing from the unauthorized device can be prevented.

A reprogramming device (external device) (not shown) capable of acquiring the programs and data stored in the memories of the central ECU 2 and the zone ECU 3 is detachably connected to the communication system 1 described above. By communication with the reprogramming device, the central ECU 2 adds the program and data thereof to the reprogramming device, and commands the zone ECU 3 to add the program and data thereof to the reprogramming device. The regular code stored in the zone ECU 3 described above can be added (acquired) by the communication with the reprogramming device (external device) before the input-output interface unit 4 is connected.

In the example described above, the zone ECU 3 communicates with the reprogramming device via the central ECU 2, and the zone ECU 3 and the reprogramming device may directly communicate with each other. The reprogramming device may be connected to the communication system 1 in a wired manner or in a wireless manner.

According to the above-described embodiment, the input-output control unit 32 switches the first changeover switch 33 to the first terminal T1 for the certain period of time when the power supply is started, determines whether the code indicated by the code pulse received from the first terminal T1 is the regular code, and turns off the power supply switch 34 to cut off the electric power supplied from the first power supply line L11 to the second power supply line L21 when the code is not the regular code. As a result, when an unauthorized device is connected to the first connector 31 of the zone ECU 3, unauthorized accessing can be prevented.

According to the above-described embodiment, the input-output control unit 32 can acquire the regular code by the communication with the reprogramming device.

According to the above-described embodiment, in the input-output interface unit 4, the timer circuit 47 switches the second changeover switch 45 and the third changeover switch 46 to the pulse output unit 44 for the certain period of time when the power supply is started, and causes the pulse output unit 44 to output the code pulse to the second communication line L23. As a result, even when the input-output drive unit 41 is not provided with a microcomputer or the like and cannot perform complicated communication, the input-output drive unit 41 can transmit a code pulse when the power supply is started with a simple configuration.

The present invention is not limited to the above-described embodiment, and modifications, improvements, and the like can be made as appropriate. In addition, materials, shapes, dimensions, numbers, arrangement locations, and the like of elements in the above-described embodiment are optional and not limited as long as the object of the present invention can be achieved.

For example, the input-output drive unit may also be provided on the substrate of the zone ECU 3. The input-output drive unit provided in the zone ECU 3 is connected to a standard electrical device commonly mounted on a high grade vehicle and a low grade vehicle, and the input-output drive unit 41 provided in the input-output interface unit 4 may be connected to an extended electrical device mounted on the high grade vehicle, in this case, the input-output interface unit 4 is mounted only in the communication system 1 mounted on the high grade vehicle, and is not mounted in the communication system 1 mounted on the low grade vehicle.

According to the above-described embodiment, the input-output control unit 32 acquires the regular code by the communication with the reprogramming device, but the present invention is not limited thereto. For example, an Operation switch may be provided in the zone ECU 3, and the input-output control unit 32 may acquire the regular code according to ON-OFF information of the operation switch.

According to the above-described embodiment, the first and second connectors 31, 42 are employed as first and second connection units, but the present invention is not limited thereto. As the first and second connection units, those that can be connected to a pin header may be employed.

Here, characteristics of the embodiment of the control device and the input-output interface unit according to the present invention described above will be briefly summarized and listed in [1] to [3] below.

[1] A control device (3) for controlling an input-output interface unit (4) including an input-output circuit (41) which is one of an input circuit and an output circuit for an electrical device (5), the control device (3) includes:
a first power supply line (L11, L12) to which electric power is supplied;
a first communication line (L13) for transmitting a signal;
a first connection unit (31) for connecting a second power supply line (L21, L22) and a second communication line (L23) of the input-output interface unit (4) to the first power supply line (L11, L12) and the first communication line (L13);
a control unit (32) that controls the input-output interface unit (4); and
a first changeover unit (33) that switches a connection destination of the first communication line (L13) between a first terminal (T1) that receives a code pulse and a second terminal (T2) that receives or outputs a communication signal.

The control unit (32) switches the first changeover unit (33) to the first terminal (T1) for a certain period of time when the power supply is started, determines whether a code indicated by the code pulse received from the first terminal (T1) is a regular code, and cuts off the electric power supplied from the first power supply line (L11, L12) to the second power supply line (L21, L22) when the code is not the regular code.

[2] In the control device (3) according to [1], the control unit (32) acquires the regular code by communication with an external device.

[3] An input-output interface unit (4) including an input-output circuit (41) which is one of an input circuit and an output circuit for an electrical device (5) and operating in accordance with communication with a control device (3), the input-output interface unit (4) includes:
a second power supply line (L21, L22) to which electric power is supplied;
a second communication line (L23) for transmitting a signal;
a second connection unit (42) for connecting a first power supply line (L11, L12) and a first communication line (L13) of the control device (3) to the second power supply line (L21, L22) and the second communication line (L23);
a pulse output unit (44) that outputs a code pulse;
a second changeover unit (45) that switches a connection destination of the second power supply line (L21, L22) between the pulse output unit (44) and the input-output circuit (41);
a third changeover unit (46) that switches a connection destination of the second communication line (L23) between the pulse output unit (44) and the input-output circuit (41); and
a timer circuit (47) that switches the second changeover unit (45) and the third changeover unit (46) to the pulse output unit (44) for a certain period of time when the power supply is started, and causes the pulse output unit (44) to output the code pulse to the second communication line (L23).

According to the control device having the configuration of [1], the control unit can determine whether a code pulse transmitted from a device connected to the first connection unit at the time of power supply is the regular code pulse, and can cut off the electric power supplied to the device connected via the first connection unit when the code pulse is not the regular code pulse. As a result, when an unauthorized device is connected to the first connection unit of the control device, unauthorized accessing can be prevented.

According to the control device having the configuration of [2], the regular code pulse can be acquired by the communication with the external device.

According to the input-output interface unit having the configuration of [3], the timer circuit switches the second changeover unit and the third changeover unit to the pulse output unit for the certain period of time when the power supply is started, and causes the pulse output unit to output the code pulse to the second communication line. As a result, even when a microcomputer or the like is not provided and complicated communication cannot be performed, the code pulse can be transmitted when the power supply is started with a simple configuration.

According to the present invention, it is possible to provide a control device and an input-output interface unit capable of preventing unauthorized accessing to the control device when an unauthorized device is connected to the control device.

What is claimed is:

1. A control device configured to control an input-output interface unit including an input-output circuit which is one of an input circuit and an output circuit for an electrical device, the control device comprising:
- a first power supply line to which electric power is supplied;
- a first communication line through which a signal is transmitted;
- a first connection unit configured to connect a second power supply line of the input-output interface unit and a second communication line of the input-output interface unit to the first power supply line and the first communication line;
- a control unit configured to control the input-output interface unit; and
- a first changeover unit configured to switch a connection destination of the first communication line between a first terminal that receives a code pulse and a second terminal that receives or outputs a communication signal,
- wherein the control unit switches the first changeover unit to the first terminal for a certain period of time when the power supply is started, determines whether a code indicated by the code pulse received from the first terminal is a regular code, and cuts off the electric power supplied from the first power supply line to the second power supply line when the code is not the regular code.

2. The control device according to claim 1,
wherein the control unit acquires the regular code by communication with an external device.

3. An input-output interface unit including an input-output circuit which is one of an input circuit and an output circuit for an electrical device and configured to operate in accordance with communication with a control device, the input-output interface unit comprising:
- a second power supply line to which electric power is supplied;
- a second communication line through which a signal is transmitted;
- a second connection unit configured to connect a first power supply line of the control device and a first communication line of the control device to the second power supply line and the second communication line;
- a pulse output unit configured to output a code pulse;
- a second changeover unit configured to switch a connection destination of the second power supply line between the pulse output unit and the input-output circuit;
- a third changeover unit configured to switch a connection destination of the second communication line between the pulse output unit and the input-output circuit; and
- a timer circuit configured to switch the second changeover unit and the third changeover unit to the pulse output unit for a certain period of time when the power supply is started, and cause the pulse output unit to output the code pulse to the second communication line.

* * * * *